United States Patent [19]
Lee

[11] Patent Number: 5,973,725
[45] Date of Patent: Oct. 26, 1999

[54] CO-CHANNEL INTERFERENCE CANCELER AND METHOD THEREFOR

[75] Inventor: Myeong-hwan Lee, Suwon, Rep. of Korea

[73] Assignee: Samsung Electronics Co., Ltd., Kyungki-do, Rep. of Korea

[21] Appl. No.: 09/090,408

[22] Filed: Jun. 4, 1998

[30] Foreign Application Priority Data

Jul. 10, 1997 [JP] Japan .................................. 97-31991

[51] Int. Cl.⁶ ................................ H04N 5/38; H04N 5/21
[52] U.S. Cl. .............................................. 348/21; 348/614
[58] Field of Search ............................ 348/21, 470, 723, 348/724, 614, 607; 375/348–350

[56] References Cited

U.S. PATENT DOCUMENTS

| | | | |
|---|---|---|---|
| 5,260,793 | 11/1993 | Citta et al. | 358/167 |
| 5,512,957 | 4/1996 | Hulyalkar | 348/607 |
| 5,546,132 | 8/1996 | Kim et al. | 348/607 |
| 5,594,496 | 1/1997 | Mielsen | 348/21 |
| 5,602,602 | 2/1997 | Hulyalkar | 348/607 |
| 5,745,187 | 4/1998 | Hulyalker et al. | 348/607 |
| 5,777,692 | 7/1998 | Ghosh | 348/21 |
| 5,793,417 | 8/1998 | Lee | 348/27 |
| 5,798,803 | 8/1998 | Limberg | 348/726 |
| 5,821,759 | 9/1998 | Limberg | 348/21 |
| 5,821,988 | 10/1998 | Citta et al. | 348/21 |
| 5,886,748 | 3/1999 | Lee | 348/614 |

*Primary Examiner*—Victor R. Kostak
*Attorney, Agent, or Firm*—Sughrue, Mion, Zinn, Macpeak & Seas, PLLC

[57] ABSTRACT

A co-channel interference canceler and a method therefor. The co-channel interference canceler includes: a co-channel interference rejection filter for outputting a second input signal by removing co-channel interference from a first input signal; a first post processor for removing interference other than co-channel interference from the second input signal; a second post processor for removing interference other than co-channel interference from the first input signal; and a selection controller for selecting the output of the post processor which has less error by comparing the output of the first post processor with the output of the second post processor. Therefore, other interference such as ghost and phase noise included in an input signal are removed or reduced via the extra second post processor which is different from the first post processor of the signal path. The selection of the NRF is controlled using the signal from which other interference has been removed or decreased, thereby minimizing the effects of the other interference. As a result, error in selection of the NRF, which may be caused by the other interference, can be prevented, and selection of the NRF is reliably controlled.

24 Claims, 5 Drawing Sheets

CO-CHANNEL INTERFERENCE CANCELER AND METHOD THEREFOR

BACKGROUND OF THE INVENTION

1. Field of the Invention

The present invention relates to a co-channel interference canceler and a method therefor, and more particularly, to a co-channel interference canceler and a method therefor, which reliably cancels co-channel interference in a high definition television (HDTV) receiver.

2. Description of the Related Art

Grand Alliance-Advanced Television (GA-ATV) is a new digital television transfer system standard capable of replacing the NTSC (National Television System Committee) standard. The GA-ATV system (also called "GA-HDTV" or "GA-VSB") standardized by the Advanced Television System Committee (ATSC) adopts a vestigial side band (VSB) modulation method as a digital transfer method. A new ATV signal is transferred together with a conventional analog television signal (NTSC signal) via a television channel which is not in use in a given geographic region ("taboo" channel). Accordingly, a GA-ATV receiver must be designed to resist NTSC co-channel interference.

Figure 1:
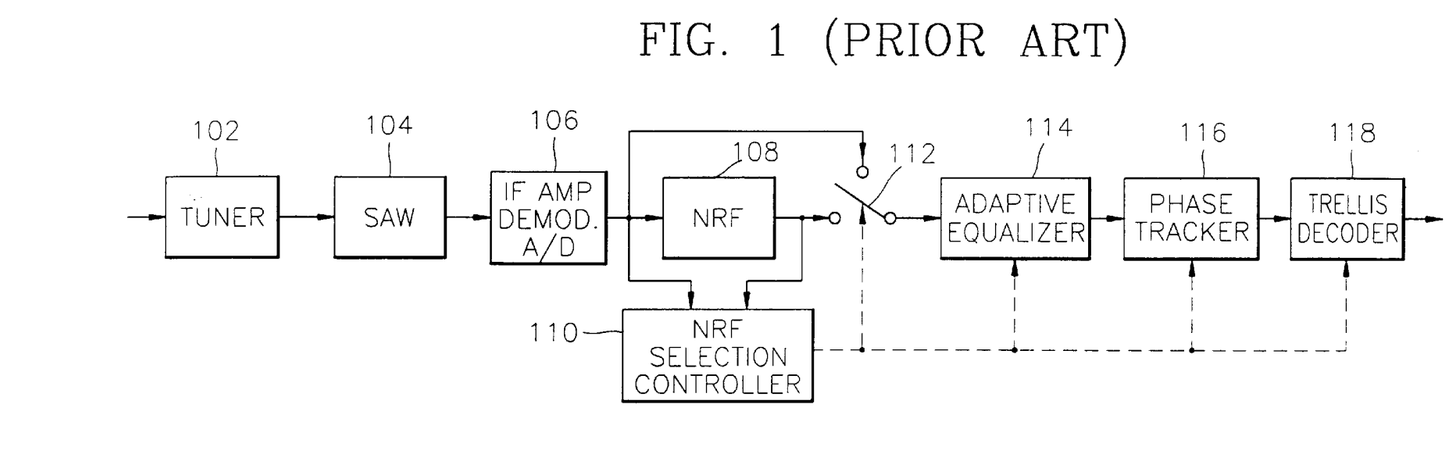
FIG. 1 is a block diagram of an HDTV including a conventional co-channel interference canceler.

The block diagram of a conventional HDTV receiver is shown in FIG. 1, which is disclosed in U.S. Pat. No. 5,594,496. An NTSC interference rejection filter (NRF) selection controller 110 of FIG. 1 may be constituted of a field comb filter, a comb filter and a comparator disclosed in the above patent, and may have a structure disclosed in the reference [1] "Guide to the Use of the Digital Television Standard for HDTV Transmission", pp.104~107, Doc.A/54, submitted to the United State Advanced Television System Committee, Apr. 12, 1995, or the NRF may have another structure.

Here, when adopting the comb filter suggested by the above patent and ATSC standards as the NRF 108, performance in removing the NTSC inference signal is excellent. However, since the comb filter subtracts two signals at full gain, the power of additive white Gaussian noise (AWGN) is increased by 3dB, thereby causing loss of signal-to-noise ratio (SNR) by 3 dB while passing through the comb filter. Also, the comb filter changes the 8-level input signal to a 15-level signal.

The NRF selection controller 110 of FIG. 1 generates a selection signal which selects the path with less error out of a path (non-NRF path) which does not include the NRF 108 and a path (NRF path) including the NRF 108, and applies the result to a selector 112, an adaptive equalizer 114, a phase tracker 116 and a trellis decoder 118. The selector 112 selects the output signal (15-level) of the NRF 108 or the output signal (8-level) of a unit 106, according to the selection signal. The adaptive equalizer 114, the phase tracker 116 and the trellis decoder 118 properly process the selected signal.

Thus, the selection of the NRF 108 by the NRF selection controller 110 of the receiver shown in FIG. 1 is performed before the adaptive equalizer 114, the phase tracker 116 and the trellis decoder 118, which means that the input signal into the NRF selection controller 110 includes AWGN, ghost, phase noise, etc. as well as the co-channel interference signal. To solve this problem, according to the above patent, the input signal including field sync of successive fields is comb-filtered by using a field comb filter to generate a subtraction signal from which static ghost, DC offset, symbol interference, etc. has been removed. The NRF is selected by comparing the comb-filtered substraction signal with a subtraction signal which does not go through the comb filter, thereby removing the NTSC co-channel interference and other interference.

However, in the above patent, moving ghost or phase noise is not removed, so reliability in controlling selection of the NRF is still less than optimum.

On the other hand, as another conventional co-channel interference canceler, U.S. Pat. No. 5,546,132 discloses an NTSC interference detector using received data over all periods instead of a data field sync reference pattern. U.S. Pat. No. 5,602,583 discloses an NTSC interference rejection filter with a switched tomlinson precoder for reducing the NTSC co-channel interference in an ATV receiver, and U.S. Pat. No. 5,325,188 discloses an NTSC signal interference canceler using digital recursive notch filters.

SUMMARY OF THE INVENTION

It is an object of the present invention to provide a highly reliable co-channel interference canceler which determines whether co-channel interference exists after removing other interference from an input signal including co-channel interference and other interference.

It is another object of the present invention to provide a highly reliable method for canceling co-channel interference by determining whether co-channel interference exists after removing other interference from an input signal including co-channel interference and other interference.

To achieve the first object, there is provided a co-channel interference canceler comprising: a co-channel interference rejection filter for outputting a second input signal by removing co-channel interference from a first input signal; a first post processor for removing interference other than co-channel interference from the second input signal; a second post processor for removing interference other than co-channel interference from in the first input signal; and a selection controller for selecting the output of the post processor which has less error by comparing the output of the first post processor with the output of the second post processor.

To achieve the second object, there is provided a method for canceling co-channel interference comprising the steps of: (a) removing co-channel interference from an input signal; (b) removing interference other than co-channel interference from the signal from which the co-channel interference has been removed, and outputting the result as a first signal; (c) removing interference other than co-channel interference from the input signal, and outputting the result as a second signal; and (d) selecting the signal with less error out of the first signal with the second signal.

BRIEF DESCRIPTION OF THE DRAWINGS

The above objects and advantages of the present invention will become more apparent by describing in detail preferred embodiments thereof with reference to the attached drawings in which.

DESCRIPTION OF THE PREFERRED EMBODIMENT

Figure 2:
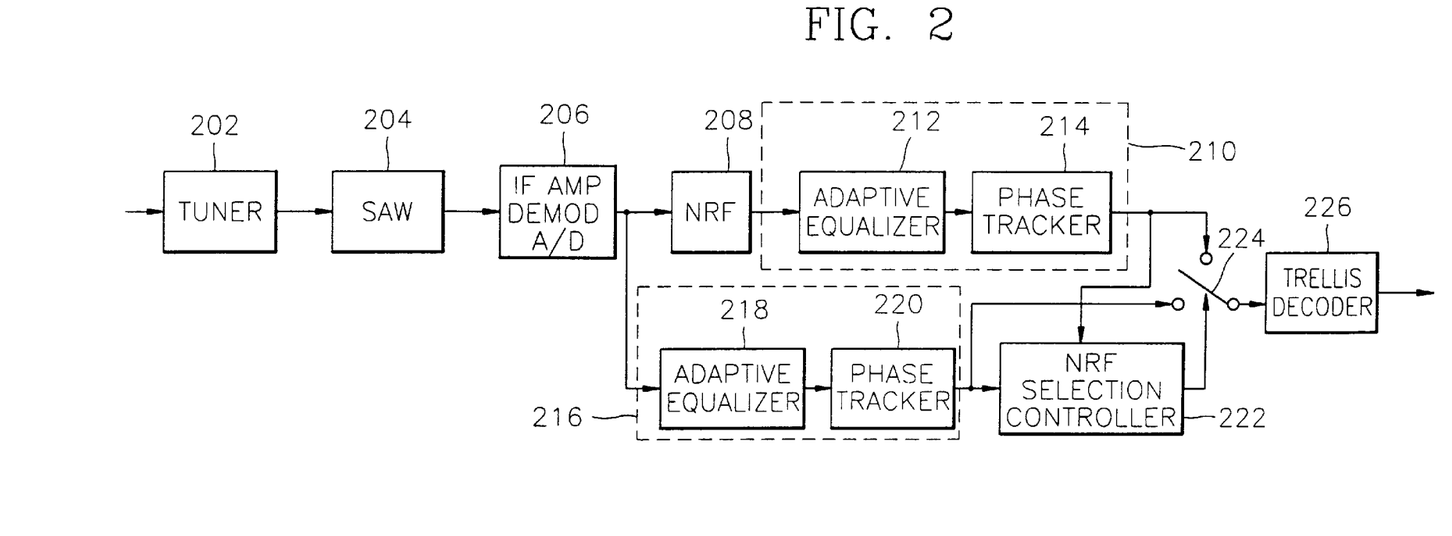
FIG. 2 is a block diagram of an HDTV including a co-channel interference canceler according to a first embodiment of the present invention.

In FIG. 2, a tuner 202 converts a high definition television (HDTV) signal input via an antenna into an intermediate frequency (IF) signal of a predetermined frequency. A signal of an adjacent channel interferes with the signal of a desired channel. Thus, in order to prevent the interference, the output of the tuner 202 passes through a surface acoustic wave (SAW) filter 204 having 6 MHz band width. A unit 206 controls the amplitude of the IF signal, demodulates the IF signal using a pilot signal included in the IF signal into a base band signal, and converts the demodulated signal into digital data.

An NTSC interference rejection filter (NRF) 208 removes the NTSC component from the output of the unit 206 in order to prevent deterioration of the HDTV signal by the NTSC signal. Here, the NRF 208 may be constituted of a comb filter disclosed as the ATSC standards of the reference [1] and in U.S. Pat. No. 5,594,496, or other various types of filter such as a fine impulse response (FIR) filter or a notch filter as disclosed in U.S. Pat. No. 5,325,188. However, the case where the NRF 208 adopts a comb filter will be described as an example.

An adaptive equalizer 212 of a first post processor 210 removes multipath distortion (so-called "ghost"), caused in the transmission channel, from the 15-level signal passed through the NRF 208. A phase tracker 214 removes phase noise, i.e., phase error, from the equalized signal output from the adaptive equalizer 212.

An adaptive equalizer 218 of a second post processor 216 removes the ghost from the 8-level signal output from the unit 206 without passing through the NRF 208, and the phase tracker 220 removes the phase error from the equalized signal output from the adaptive equalizer 218.

The idea of the present invention is to more reliably control selection of the NRF 208, by removing other interference from the input signal by using the second post processor 216 such that an input signal (non-NRF signal) which does not pass through the NRF, with virtually only co-channel interference, and the signal (NRF signal) via the NRF, output from the first post processor 210, are applied to an NRF selection controller 222. That is, the NRF selection controller 222 generates a selection signal which selects the signal of the path with less error out of the post-processed NRF signal and the non-NRF signal. As an example of the NRF selection controller 222, a method other than the method suggested by the reference [1] may be used.

A selector 224 selects either the NRF signal output from the first post processor 210 or the non-NRF signal output from the second post processor 216, according to the selection signal, and outputs the selected signal to a trellis decoder 226. The trellis decoder 226 performs trellis decoding properly on the signal selected by the selector 224 according to the signal state (8-level or 15-level).

Unlike the conventional receiver shown in FIG. 1, where the input or output signal of the NRF 108 is input to the NRF selection controller 110, the output of the extra second post processor 216 including the adaptive equalizer 218 and the phase tracker 220, which removes or reduces interference other than co-channel interference, is input to the NRF selection controller 222 in FIG. 2.

Basically, signals input to the NRF selection controller 222 correspond to the NRF signal from which the ghost has been removed by the adaptive equalizer 212 and the phase noise has been removed by the phase tracker 214, and the non-NRF signal from which the ghost has been removed by the adaptive equalizer 218 and the phase noise has been removed by the phase tracker 220. Here, the first and second post processors 210 and 216 may further include units capable of removing other interference, such as a noise reducer for reducing AWGN, as well as the adaptive equalizers 212 and 218 and the phase trackers 214 and 220. Thus, most of the interference other than co-channel interference is removed or reduced by the first and second post processors 210 and 216.

When the input signal contains interference (ghost, phase noise, etc.) other than co-channel interference, such interference affects the selection of the NRF. However, such other interference can be removed or considerably reduced by an extra process corresponding to the type of interference. Thus, it is preferable to remove the effect of the interference in the controlling selection of the NRF. The most preferable method is to add the second post processor 216 for removing other interference of respective paths as shown in FIG. 2 to control the selection of the NRF. In this case, interference other than co-channel interference can be mostly removed or reduced from both the NRF path and non-NRF path. Accordingly, the control of selection of the NRF is more reliable.

However, the two post processors 210 and 216 shown in FIG. 2 have the same complexity and structure as each other. To use two duplicate post processors uses a lot of hardware. To solve this problem, a structure shown in FIG. 3 may be used.

Figure 3:
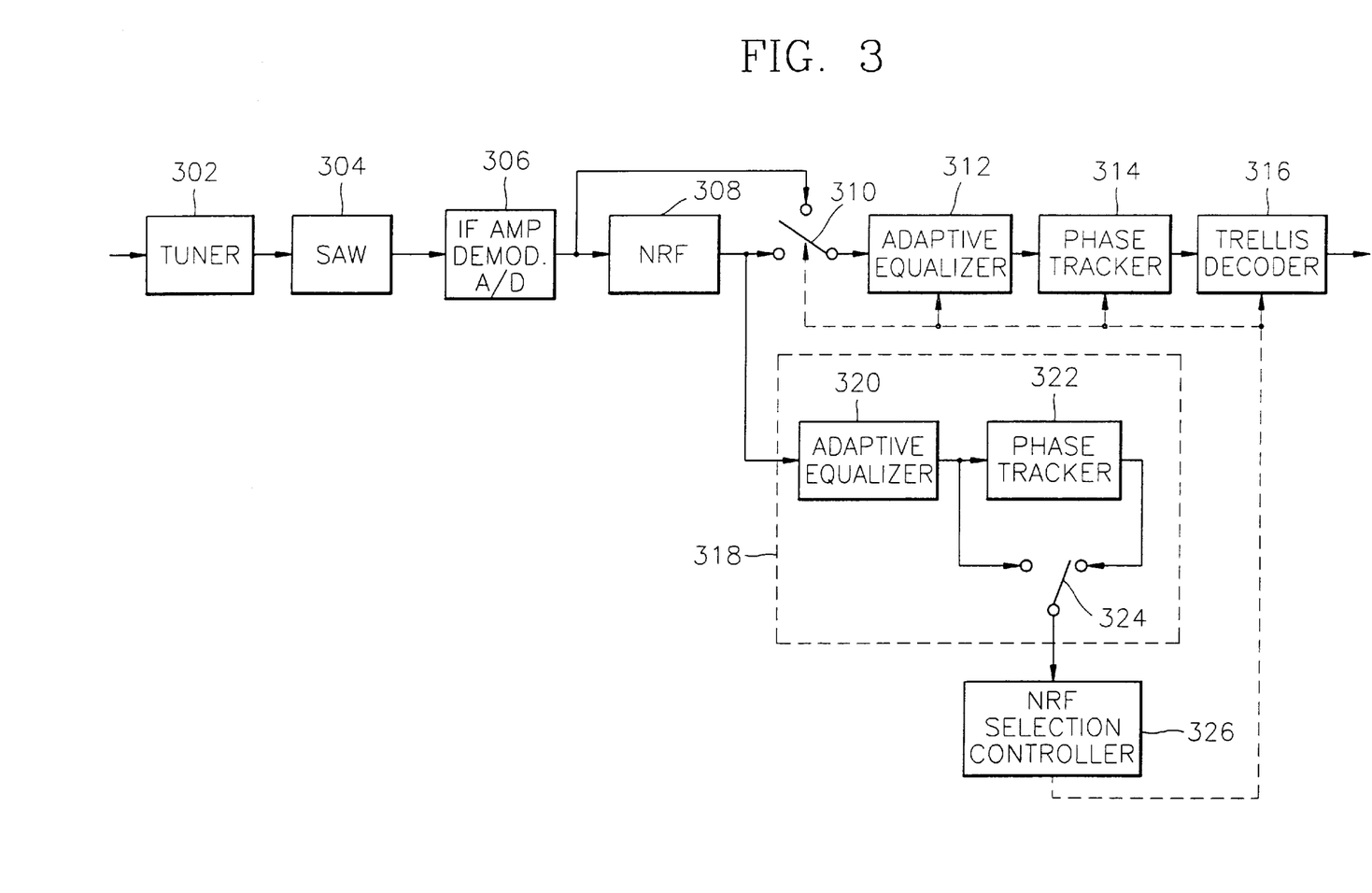
FIG. 3 is a block diagram of an HDTV receiver including a co-channel interference canceler according to a second embodiment of the present invention.

FIG. 3 is a block diagram of an HDTV receiver including a co-channel interference canceler according to a second embodiment of the present invention. Here, explanation of parts of the structure which are the same as that of FIG. 2 will be omitted.

In FIG. 3, a post processor 318 is an extra path which is not in the signal processing path of the receiver. Here, the components of the post processor 318 may have different structure and complexity from those of the signal processing path (including the adaptive equalizer 312 and the phase tracker 314) corresponding to the post processor of the receiver.

The post processor 318 receives the output of the NRF 308. However, the post processor 318 does not operate on all input signals, as it is not on the signal processing path. That is, the post processor 318 processes the data of a known signal period (data of the field sync segment period in the case of GA-VSB signal), which has passed through the NRF 308. The post processor 318 may contain one or both of the adaptive equalizer 320 for removing ghost and the phase tracker 322 for removing phase error, or may further include a unit capable of removing other noise. Thus, the post processor 318 has a different structure and complexity from the adaptive equalizer and the phase tracker 314 which correspond to the post processor of the signal processing path.

Figure 4:
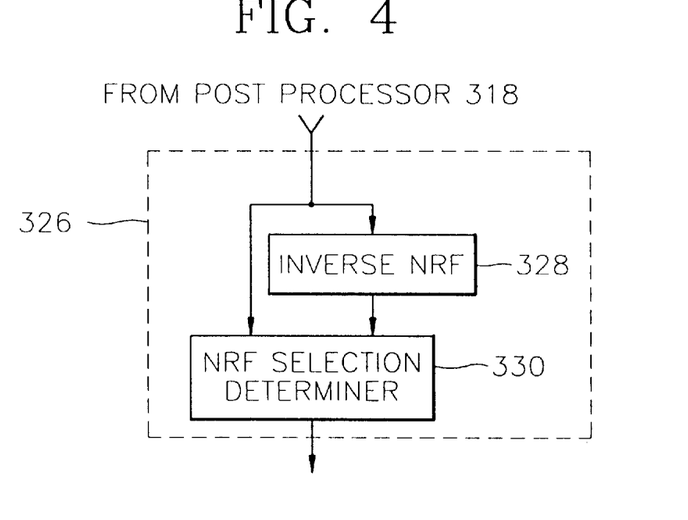
FIG. 4 shows an example of an NRF selection controller shown in FIG. 3.

FIG. 4 shows an example of the NRF selection controller 326 of FIG. 3.

In FIG. 4, the NRF selection controller 326 receives the NRF signal output from the post processor 318, from which interference such as the ghost and the phase noise have been removed. An inverse NRF 328 has the inverse characteristics of the NRF 308. Thus, an NRF selection determiner 330 compares the NRF path output from the post processor 318 with the non-NRF path output from the inverse NRF 328, and thus generates a selection signal which is used to select the path having better conditions.

In most determinations for the selection of the NRF performed by the NRF selection determiner 330, the channel states of the NRF path and the non-NRF path are detected using the data of a known signal period (data of the field sync segment period in the case of GA-VSB signal), to select the channel with the better channel conditions. For example, methods other than the method suggested by the reference [1] may be used.

Figure 5:
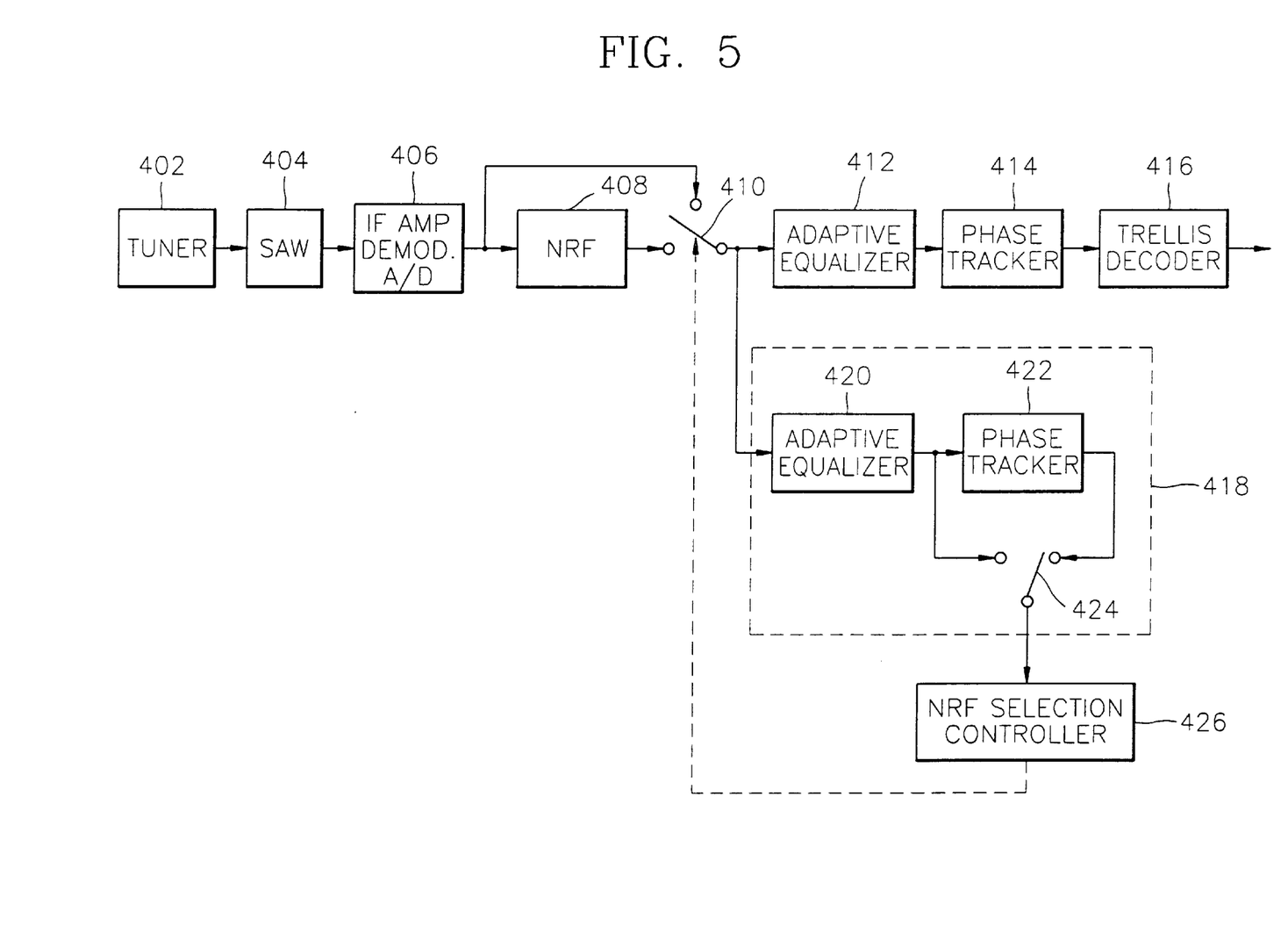
FIG. 5 is a block diagram of an HDTV receiver including a co-channel interference canceler according to a third embodiment of the present invention.

On the other hand, the NRF selection controller 326 shown in FIG. 3 always uses the NRF signal, while an NRF selection controller 426 shown in FIG. 5 can selectively receive the NRF signal or the non-NRF signal. That is, the NRF selection controller 426 receives the output signal of a selector 410 which is controlled by the NRF selection controller 426, thus the NRF signal or the non-NRF signal is input to the NRF selection controller 426.

Figure 6:
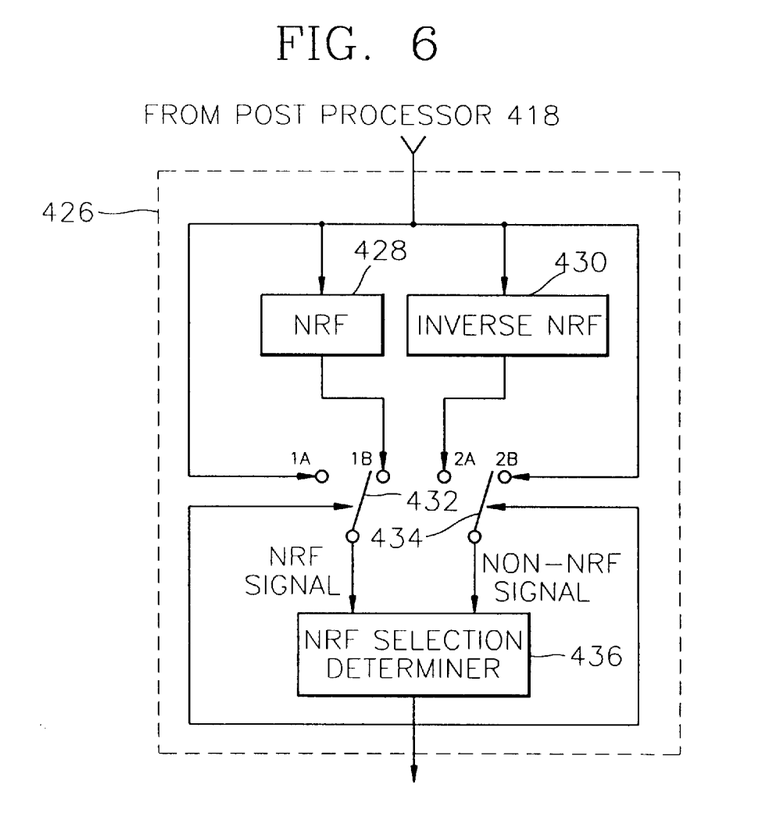
FIG. 6 shows an example of an NRF selection controller shown in FIG. 5.

FIG. 6 shows an example of the NRF selection controller 426 of FIG. 5.

In FIG. 6, when the output of the post processor 418 of FIG. 5 is an NRF signal, a first selection switch 432 selects the output of the post processor 418, from a contact point 1A, that is, the NRF path, and a second selection switch 434 selects the output of an inverse NRF 430, from a contact point 2A, that is, the non-NRF path. On the other hand, when the output of the post processor 418 of FIG. 5 is a non-NRF signal, the first selection switch 432 selects the output of an NRF 428, from a contact point 1B, that is, the NRF path, and the second selection switch 434 selects the output of the post processor 418, from a contact point 2B, that is, the non-NRF path. Here, the first and second selection switches 432 and 434 may be constructed using a digital logic circuit such as a multiplexer.

An NRF selection determiner 436 always receives the NRF path switched by the first selection switch 432 and the non-NRF path switched by the second selection switch 434, to select the channel with the better condition. Also, the NRF selection determiner 436 controls the first and second selection switches 432 and 434 by feeding back the selected result to the selection switches, and simultaneously controls the selector 410 of FIG. 5, thereby continuously controlling the NRF 408 of FIG. 5 using the post-processed signal.

Figure 7:
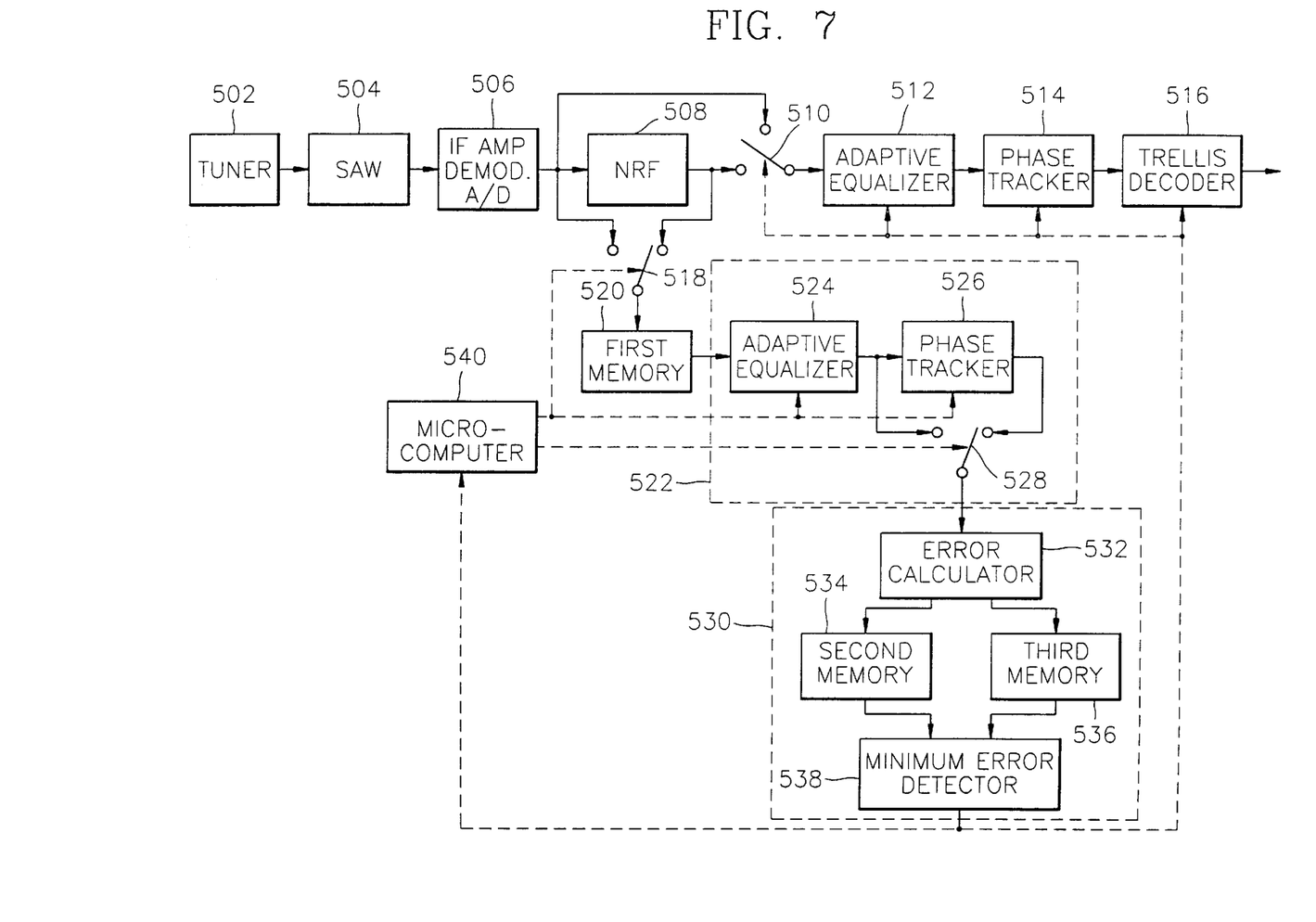
FIG. 7 is a block diagram of an HDTV receiver including a co-channel interference canceler according to a fourth embodiment of the present invention.

FIG. 7 is a block diagram of an HDTV receiver including a co-channel interference canceler according to a fourth embodiment of the present invention.

In FIG. 7, known data of the NRF signal from the NRF 508 (data of field sync segment period in the case of GA-VSB) and known data of non-NRF signal are alternately selected by a selector 518 according to the control of a microcomputer 540 and stored in a first memory 520.

An error calculator 532 calculates the error of the NRF signal or the non-NRF signal which is output from a post processor 522. Here, the error is calculated by comparison with reference data using a mean square error (MSE) algorithm or a symbol error rate (SER) algorithm.

The error calculator 532 alternately outputs the error of the non-NRF signal and the NRF signal, and stores the errors in a second memory 534 and a third memory 536, respectively. A minimum error detector 538 may be comprised of a comparator. The minimum error detector 538 compares the error of the non-NRF path, output from the second memory 534, with the error of the NRF path, output from the third memory 536, and generates an NRF selection signal which selects the path with less error, and outputs the NRF selection signal to a selector 510. The NRF selection signal is also output to a microcomputer 540, an adaptive equalizer 512, a phase tracker 514 and a trellis decoder 516.

Even though the HDTV receiver of FIG. 7 has an extra path, the extra path does not directly affect the signal path, since the known signal period is used under the control of the microcomputer 540, and there is also time to spare. Also, the components from the second selector 518 through to the minimum error detector 538 may be constituted as software within the microcomputer 540.

As described above, in the co-channel interference canceler of the present invention, and the method therefor, other interference such as ghost and phase noise in an input signal is removed or reduced via an extra post process which is different from the signal path, and the selection of the NRF is controlled using the signal from which other interference has been removed or decreased, thereby minimizing the effects of interference other than co-channel interference. As a result, error in selection of the NRF, which may be caused by the other interference, can be prevented, and control of the selection of the NRF is more reliable.

What is claimed is:

1. A co-channel interference canceler comprising:
    a co-channel interference rejection filter for outputting a second input signal by removing co-channel interference from a first input signal;
    a first post processor for removing interference other than co-channel interference from the second input signal and outputting a first post-processed signal;
    a second post processor for removing interference other than co-channel interference from the first input signal and outputting a second post-processed signal; and
    a selection controller for comparing the first post-processed signal and the second post-processed signal and outputting the first post-processed signal or the second post-processed signal based upon which of the first post-processed signal and the second post-processed signal has the least error.

2. The co-channel interference canceler of claim 1, wherein the first and second post processors each comprise an adaptive equalizer for removing ghost from an input signal.

3. The co-channel interference canceler of claim 1, wherein the first and second processors each comprise:
    an adaptive equalizer for outputting an equalized signal by removing ghost from an input signal; and
    a phase tracker for removing phase noise from the equalized signal.

4. A co-channel interference canceler comprising:
    an NTSC interference rejection filter (NRF) for outputting a second input signal by removing the co-channel interference from a first input signal;
    a selector for selecting either the first input signal or the second input signal according to a selection signal, and for outputting the selected signal;
    a post processor for outputting a post-processed signal by removing interference other than co-channel interference from the second input signal; and
    an NRF selection controller for generating the selection signal, according to the post-processed signal.

5. The co-channel interference canceler of claim 4, wherein the NRF selection controller comprises:

an inverse NRF for outputting a non-NRF signal by processing the post-processed signal to have inverse characteristics of the NRF; and a determiner for generating the selection signal by selecting the signal with less error out of the post-processed signal and the non-NRF signal.

6. The co-channel interference canceler of claim 4, wherein the post processor comprises an adaptive equalizer for removing ghost from the selected signal.

7. The co-channel interference canceler of claim 4, wherein the post processor comprises:

an adaptive equalizer for outputting an equalized signal by removing ghost from the selected signal; and a phase tracker for removing phase noise from the equalized signal.

8. A co-channel interference canceler comprising:

an NTSC interference rejection filter (NRF) for outputting a second input signal by removing co-channel interference from a first input signal;

a selector for selecting either the first input signal or the second input signal according to a selection signal, and for outputting the selected signal;

a post processor for outputting a post-processed signal by removing interference other than co-channel interference from the selected signal; and an NRF selection controller for generating the selection signal by determining whether or not the post-processed signal contains co-channel interference.

9. The co-channel interference canceler of claim 8, wherein the NRF selection controller comprises:

a second NRF for performing an NRF operation on the post-processed signal;

an inverse NRF for performing an inverse NRF operation on the post-processed signal;

a first selector for outputting an NRF signal by selecting either the post-processed signal or an output of the second NRF, according to the selection signal;

a second selector for outputting a non-NRF signal by selecting either the post-processed signal or an output of the inverse NRF, according to the selection signal; and a determiner for generating the selection signal by selecting the signal with less error out of the NRF signal and the non-NRF signal.

10. The co-channel interference canceler of claim 8, wherein the post processor comprises an adaptive equalizer for removing ghost from the selected signal.

11. The co-channel interference canceler of claim 8, wherein the post processor comprises:

an adaptive equalizer for outputting an equalized signal by removing ghost from the selected signal; and a phase tracker for removing phase noise from the equalized signal.

12. A co-channel interference canceler comprising:

an NTSC interference rejection filter (NRF) for outputting a second input signal by removing co-channel interference from a first input signal;

a selector for selecting either the first input signal or the second input signal according to a selection signal and outputting the selected signal; and an NRF selection controller for generating the selection signal by using the signal obtained by removing interference other than co-channel interference from a predetermined signal of the first input signal and the signal obtained by removing interference other than co-channel interference from a predetermined signal of the second input signal.

13. The co-channel interference canceler of claim 12, wherein the NRF selection controller comprises a microcomputer.

14. The co-channel interference canceler of claim 12, wherein the NRF selection controller comprises:

a selector for alternately selecting the first input signal and the second input signal;

a first memory for storing data of the predetermined signal period of the selected signal;

a post processor for removing interference other than co-channel interference from the data stored in the first memory;

an error calculator for calculating errors of the first input signal and the second input signal which are alternately output from the post processor;

a second memory for storing the error of the first input signal, output from the error calculator;

a third memory for storing the error of the second input signal, output from the error calculator; and a minimum error detector for generating the selection signal by selecting the signal with less error by comparing the error of the first input signal with the error of the second input signal.

15. The co-channel interference canceler of claim 14, wherein the post processor comprises an adaptive equalizer for removing ghost from the signal stored in the first memory.

16. The co-channel interference canceler of claim 14, wherein the post processor comprises at least:

an adaptive equalizer for outputting an equalized signal by removing ghost from the signal stored in the first memory; and a phase tracker for removing phase noise from the equalized signal.

17. A method for canceling co-channel interference comprising the steps of:

(a) removing co-channel interference from an input signal;

(b) removing interference other than co-channel interference from the signal from which the co-channel interference has been removed, and outputting the result as a first signal;

(c) removing interference other than co-channel interference from the input signal, and outputting the result as a second signal; and (d) selecting the signal with less error out of the first signal with the second signal.

18. A method for canceling co-channel interference comprising the steps of:

(a) removing co-channel interference from a first input signal and outputting the result as a second input signal;

(b) selecting either the first input signal or the second input signal according to a selection signal, and outputting the selected signal;

(c) removing interference other than co-channel interference from the second input signal and outputting the result as a post-processed signal; and (d) generating the selection signal according to the post-processed signal.

19. The method of claim 18, wherein the step (d) of generating the selection signal comprises the sub-steps of:
  (d1) outputting a non-NRF signal by processing the post-processed signal to have inverse characteristics of an NTSC interference rejection filter (NRF); and
  (d2) generating the selection signal by selecting the signal with less error out of the post-processed signal and the non-NRF signal.

20. A method for canceling co-channel interference comprising the steps of:
  (a) removing co-channel interference from a first input signal and outputting the result as a second input signal;
  (b) selecting either the first input signal or the second input signal according to a selection signal, and outputting the selected signal;
  (c) outputting a post-processed signal by removing interference other than co-channel interference from the selected signal; and
  (d) generating the selection signal according to the post-processed signal.

21. The method of claim 20, wherein the step (d) of generating the selection signal comprises the sub-steps of:
  (d1) outputting a third input signal by performing an NTSC interference rejection filter (NRF) operation on the post-processed signal;
  (d2) outputting a fourth input signal by performing an inverse NRF on the post-processed signal;
  (d3) outputting an NRF signal by selecting either the post-processed signal or the third input signal according to the selection signal;
  (d4) outputting a non-NRF signal by selecting either the post-processed signal or the fourth input signal according to the selection signal; and
  (d5) generating the selection signal by selecting the signal with less error out of the NRF signal and the non-NRF signal.

22. A method for canceling co-channel interference comprising the steps of:
  (a) removing co-channel interference from a first input signal and outputting the result as a second input signal;
  (b) selecting either the first input signal or the second input signal according to a selection signal, and outputting the selected signal; and
  (c) generating the selection signal according to the signal obtained by removing interference other than co-channel interference from a predetermined signal of the first input signal and the signal obtained by removing interference other than co-channel interference from a predetermined signal of the second input signal.

23. The method of claim 22, wherein the step (c) of generating the selection signal comprises the sub-steps of:
  (c1) alternately selecting the first input signal and the second input signal;
  (c2) removing interference other than co-channel interference from the predetermined signal of the selected first input signal, and outputting the result as a first processed signal;
  (c3) removing interference other than co-channel interference from the predetermined signal of the selected second input signal, and outputting the result as a second processed signal;
  (c4) generating the selection signal by selecting the signal with less error by comparing the first processed signal with the second processed signal.

24. The method of claim 22, wherein the step (c) of generating the selection signal comprises the sub-steps of:
  (c1) alternately selecting the first input signal and the second input signal;
  (c2) removing interference other than co-channel interference from the predetermined signal selected from among the first input signal and second input signal;
  (c3) calculating the errors with respect to a reference signal, of the first input signal and the second input signal from which interference other than co-channel interference has been removed, and alternately outputting the errors of the first input signal and the second input signal; and
  (c4) generating the selection signal by selecting the signal with less error by comparing the error of the first input signal with the error of the second input signal.

* * * * *